Patented Jan. 23, 1934

1,944,867

UNITED STATES PATENT OFFICE 1,944,867

RESIN SOLUTION AND METHOD OF PREPARING SAME

John H. Schmidt, Bloomfield, and Rupert S. Daniels, Newark, N. J., assignors to Bakelite Corporation, New York, N. Y., a corporation of Delaware No Drawing. Application May 7, 1927
Serial No. 189,742

10 Claims. (Cl. 134—26)

This invention relates to varnishes or analogous resin solutions of which the resin base consists wholly or in part of resins of the thiourea-formaldehyde type. A primary object of the invention is to provide an improved solution of this type, capable of yielding, upon evaporation or partial evaporation of the solvent, a varnish or lacquer film of improved characteristics and potentially reactive in character, that is to say capable of becoming infusible, and practically insoluble in common solvents, upon application of sufficient heat.

Following is a typical and preferred embodiment of the invention, it being understood however that the invention is not limited to the particular proportions of materials, solvents, or manipulations as described:

300 grams of thiourea are reacted with 650 grams of 40% formaldehyde solution for about one and one-half hours, the mixture being heated to the boiling point or somewhat less under a reflux condenser. The resulting resin which is of the fusible or so-called non-reactive type is then precipitated, preferably by addition of 1000-1500 cc. of water. The resulting resin is fully soluble in the usual organic resin solvents, and is fusible at about 100° C. Instead of thiourea we may use mixtures thereof with urea. For instance in the above example we may substitute one third, more or less, of the thiourea by urea.

The resulting non-reactive resin is dissolved in an appropriate solvent or solvent mixture, which must also be capable of dissolving polymerized formaldehyde (paraform). As such solvent ethyl lactate, ethylene glycol, the ethel ether of ethylene glycol, or mixtures thereof, is preferred, although the invention is not limited thereto, since the choice of a solvent will of course depend upon the intended application of the varnish or resin solution. To the resin solution, or to the solvent to be used in preparing such solution, paraform is now added in proportion to convert the resin to the potentially reactive state. A suitable proportion of paraform for this purpose, based on the foregoing example, is 50 to 75 grams. Instead of paraform we may use such equivalents as the so-called "solidified formaldehyde" which is a paste composed of paraform and formaldehyde solution.

The proportion of solvent used will of course depend upon the particular application or use for which the varnish or resin solution is intended. Such applications include the impregnation of fibrous or other fillers for the manufacture of molding mixtures; the coating or impregnation of sheets of paper or cloth for the manufacture of laminated products; admixture with appropriate solvents or thinners for the preparation of lacquers; and in general the manifold uses for which solutions of reactive resins are adapted in the arts. The resins prepared as above are quite resistant to most organic solvents, such as alcohol, acetone, benzene and the like; and the molded or laminated articles prepared therefrom are light-resistant and can be made in a great variety of attractive colors.

The resin solutions prepared as herein described may of course be used in conjunction with other synthetic or natural resins, including the resins of the phenol-methylene type.

We claim:

1. Process of preparing a resin solution, comprising reacting thiourea with formaldehyde in proportion to yield a permanently fusible resin; and dissolving the same, together with an anhydrous methylene-containing hardening agent, in a common solvent for said resin and hardening agent.

2. A composition of matter comprising a non-reactive thiourea resin, an anhydrous methylene-containing hardening agent in proportion to impart to the resin a potentially reactive character, and a common solvent for said resin and hardening agent of the group consisting of ethyl lactate, ethylene glycol and ethyl ether of ethylene glycol.

3. A composition of matter comprising a non-reactive thiourea resin, an anhydrous methylene-containing hardening agent in proportion to impart to the resin a potentially reactive character, and the ethyl ether of ethylene glycol.

4. In a process of preparing a resinous composition of the urea type the steps which comprise reacting a urea with a methylene-containing agent in a solution containing the same in proportions capable of forming a heat-hardenable resin to the formation of a non-heat-hardenable resin, precipitating said non-heat-hardenable resin from the reaction mixture by dilution with water and dissolving it together with a methylene-containing agent in quantity sufficient to yield a heat-hardenable resin in an organic solvent.

5. Process as defined in claim 4 in which the urea is thiourea.

6. Process as defined in claim 4 in which the urea is a mixture of urea and thiourea.

7. A composition of matter comprising a non-heat-hardenable resin of the urea-methylene type, an uncombined anhydrous methylene-containing agent in proportion to yield a heat-hardenable resin and a common organic solvent for said non-heat-hardenable resin and said methylene-containing agent, such as may be obtained by the herein-described process comprising reacting a urea with a methylene-containing agent in a solution containing the same in proportions capable of forming a heat-hardenable resin to the formation of a non-heat-hardenable resin, precipitating said non-heat-hardenable resin from the reaction mixture by dilution with water and dissolving it and the anhydrous methylene-containing agent in the organic solvent.

8. A composition of matter as defined in claim 7 in which the urea is thiourea.

9. A composition of matter as defined in claim 7 in which the anhydrous methylene-containing agent is paraform.

10. A composition of matter as defined in claim 7 in which the urea is a mixture of thiourea and urea.

JOHN H. SCHMIDT.
RUPERT S. DANIELS.